United States Patent
Fasse

(10) Patent No.: US 6,398,164 B1
(45) Date of Patent: Jun. 4, 2002

(54) CHAIR AND BED COMBINATION FOR PASSENGERS

(76) Inventor: Wolfgang G. Fasse, P.O. Box K Indian Pond La., St. Albans, ME (US) 04971

(*) Notice: Subject to any disclaimer, the term of this patent is extended or adjusted under 35 U.S.C. 154(b) by 0 days.

(21) Appl. No.: 09/618,231

(22) Filed: Jul. 18, 2000

(51) Int. Cl.$^7$ .................................................. B64D 11/01
(52) U.S. Cl. ...................................................... 244/118.6
(58) Field of Search ............................ 244/118.5, 118.6, 244/122 R; 297/240, 344.23, 344.24, 354.13; 105/316–321, 345

(56) References Cited

U.S. PATENT DOCUMENTS

| | | | | |
|---|---|---|---|---|
| 2,124,003 A | * | 7/1938 | McDonnell, Jr. et al. | 244/118.6 |
| 2,953,103 A | * | 9/1960 | Bohannon et al. | 105/315 |
| 3,738,699 A | * | 6/1973 | Fain | 296/23 R |
| 4,685,719 A | * | 8/1987 | Hanemaayer | 296/156 |
| 5,474,260 A | | 12/1995 | Schwertfeger et al. | |
| 6,000,659 A | * | 12/1999 | Brauer | 244/118.6 |
| 6,209,956 B1 | * | 4/2001 | Dryburgh et al. | 244/118.6 |

* cited by examiner

*Primary Examiner*—Galen L. Barefoot
(74) *Attorney, Agent, or Firm*—W. F. Fasse; W. G. Fasse

(57) ABSTRACT

In order to avoid converting a passenger chair, for example in an aircraft, into a passenger bed, the seating surface of the passenger chair is combinable with a separate bed surface to form a surface for sleeping. When the chair is used as a chair, the separate bed surface can be used for other purposes. The cooperation fo the seating surface with the bed surface in forming the surface for sleeping is accomplished in several ways.

23 Claims, 6 Drawing Sheets

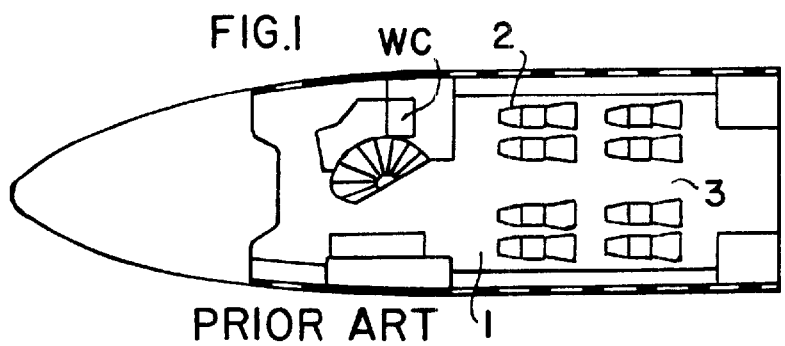
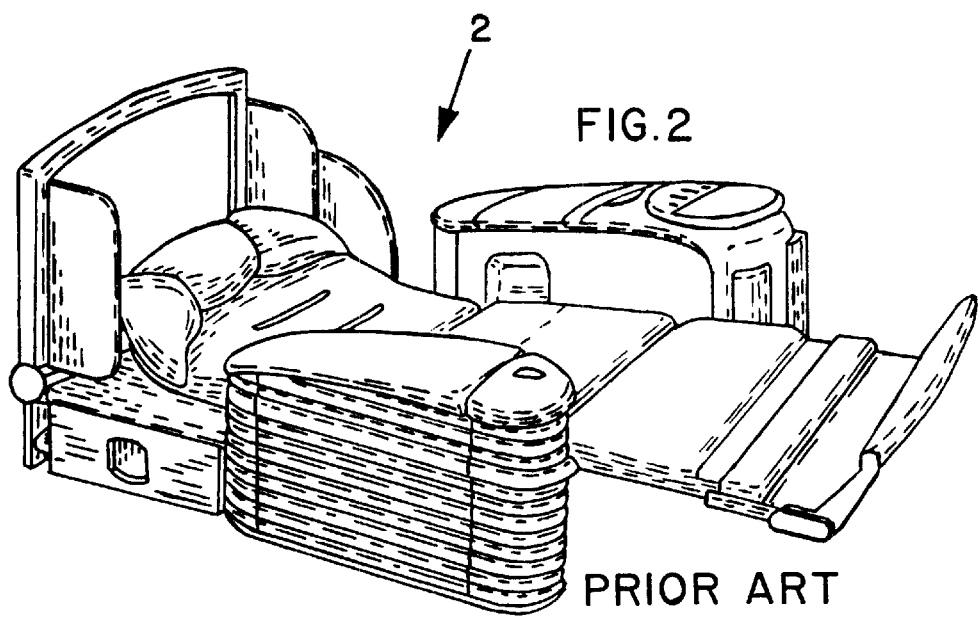

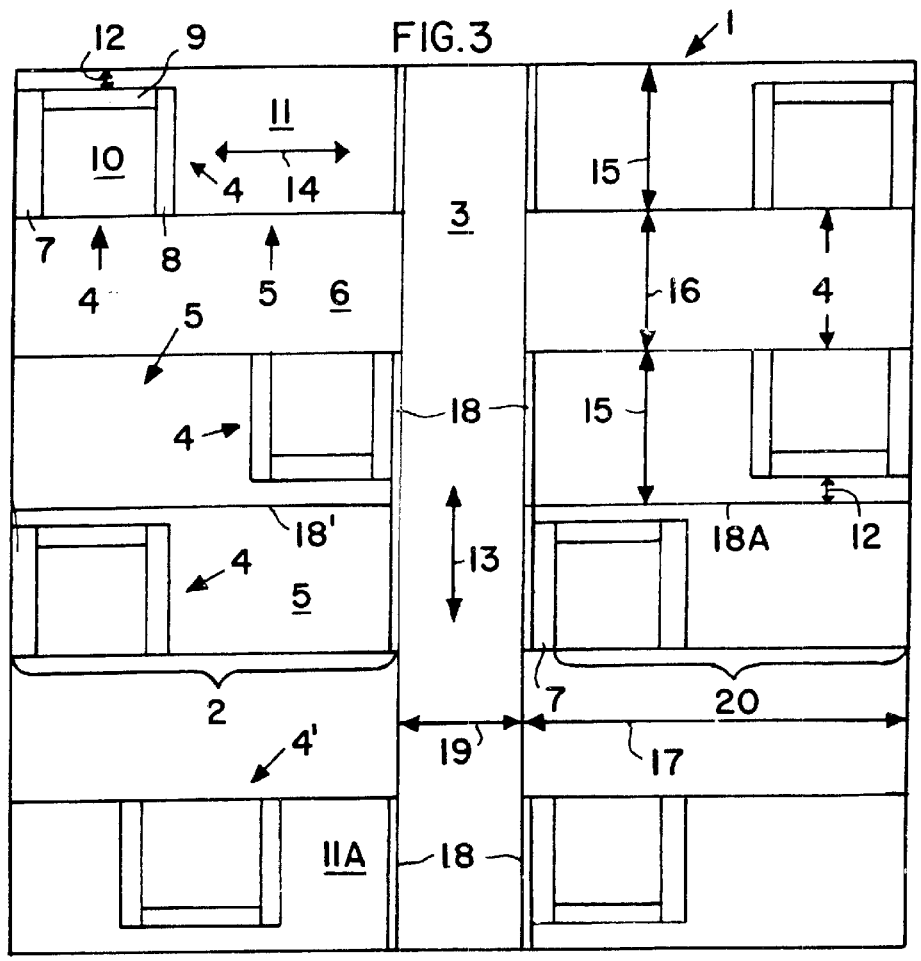

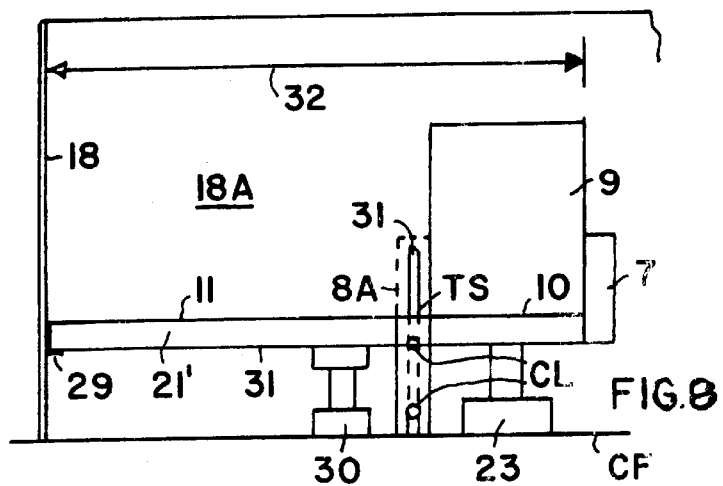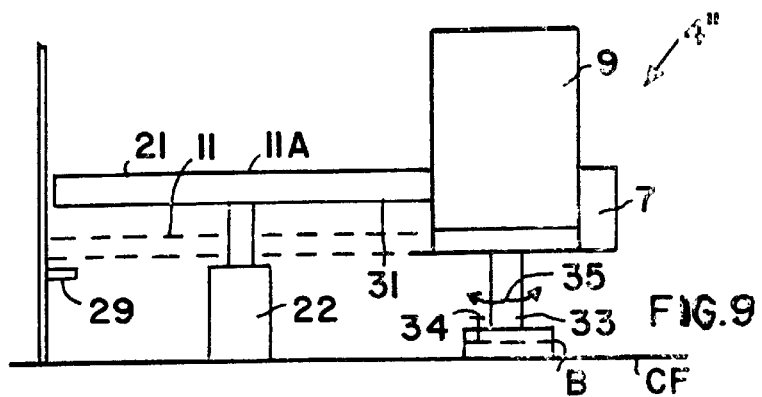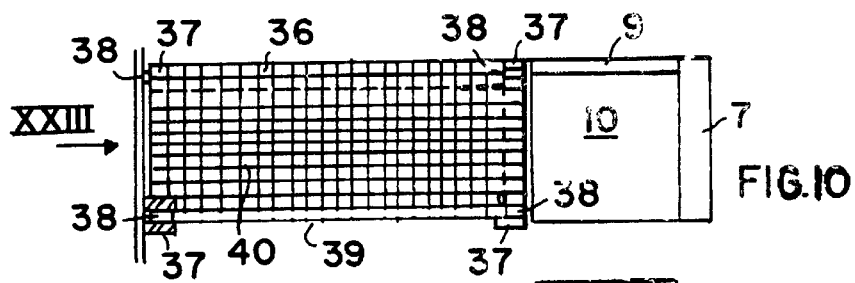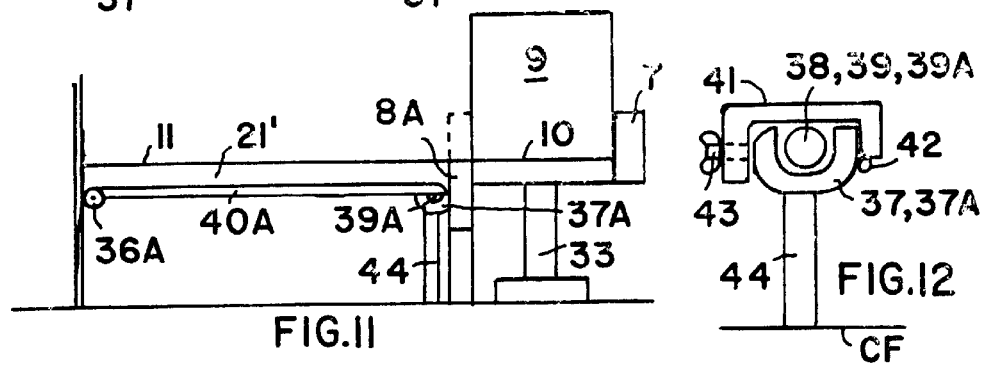

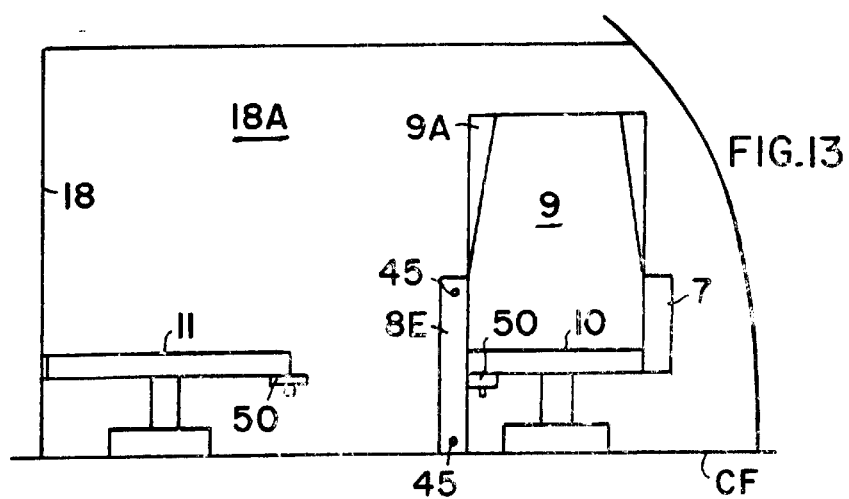
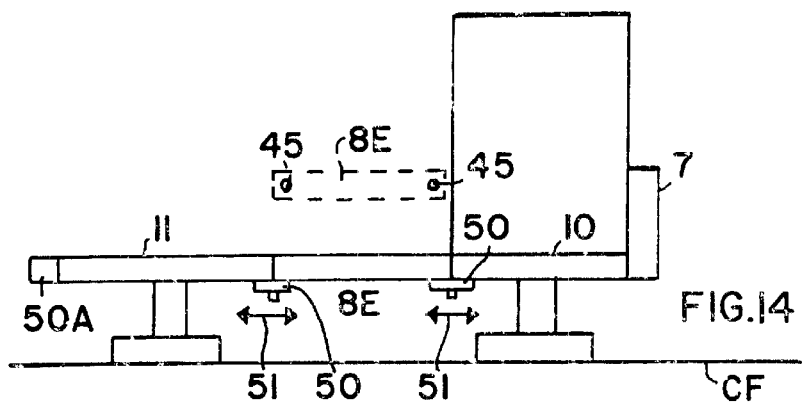
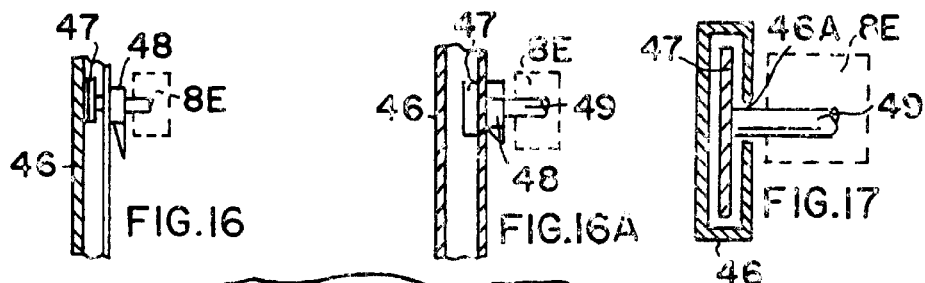
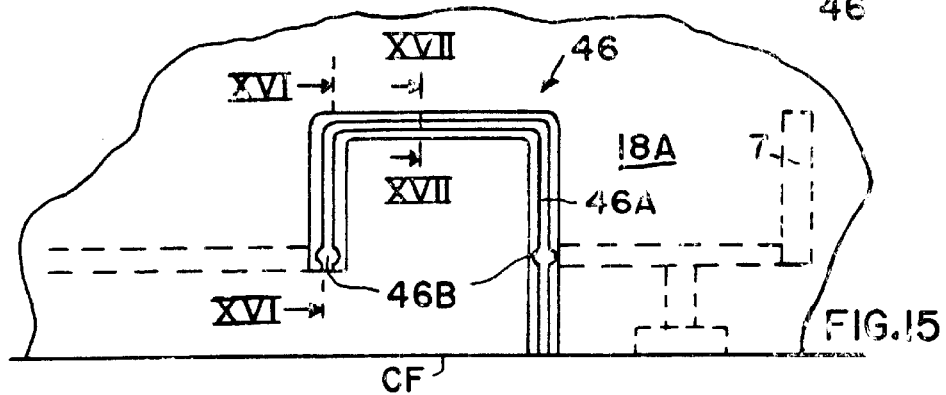

CHAIR AND BED COMBINATION FOR PASSENGERS

FIELD OF THE INVENTION

A comfort facility for passengers combines a chair with a bed. The facility is useful in trains, ships, and particularly in passenger aircraft.

BACKGROUND INFORMATION

Efforts to make travel, especially long distance travel, as comfortable as possible are well known in the art. For example, aircraft passenger chairs that convert into a bed and vice versa are used in so-called jumbo passenger aircraft. FIG. 1 shows a floor plan of an upper deck cabin of a Boeing 747-200 passenger aircraft. The upper deck cabin 1 covers a floor space of about 15×17 feet and holds a total of eight convertible chairs 2, four of which are positioned on each side of an aisle 3. The relatively large floor space taken up by these convertible chairs or chair beds could be used more efficiently or at least with an improved comfort.

FIG. 2 shows a chair 2 converted into a bed. These chairs are quite bulky and not as comfortable as might be expected. The floor area needed for each chair is quite substantial without providing a correspondingly large sleeping surface.

U.S. Pat. No. 5,474,260 (Schwertfeger et al.) discloses a large bodied aircraft with two decks. The lower deck is equipped with bedrooms and a sick bay with a bed or beds. However, these beds are not convertible, but may be constructed as bunkbeds.

It is also known to convert a passenger chair into a bed by a pull-out seat which provides a bed width of two feet which is not particularly comfortable. The foot end of the bed surface rests on a box that may also be used as a footrest.

OBJECTS OF THE INVENTION

In view of the above it is the aim of the invention to achieve the following objects singly or in combination:
- to construct a passenger chair so that its seat surface, or its seat surface and one of its armrest surfaces, can cooperate with a separate bed section without changing the configuration of the chair;
- to provide a separate bed section which can also be used with its surface for other purposes, for example as a table surface next to the respective chair;
- to use the space available in a passenger aircraft with more comfort for the passenger than was possible heretofore;
- to construct a chair/bed combination so that it can accommodate different space requirements for different passengers; and
- to construct a chair bed combination as lightweight as possible without sacrificing safety.

SUMMARY OF THE INVENTION

The above objects have been achieved according to the invention by a chair and bed combination particularly for a passenger, wherein a chair has a seat forming a seat surface that cooperates with a separate bed section forming a bed surface and wherein components for cooperation bring at least the seat surface or the bed surface into a position for cooperation with the respective other surface for forming together a sleeping surface.

In certain embodiments a seat surface and at least one armrest surface cooperate with a separate bed surface to form a sleeping surface which is at least six feet long and thirty inches wide.

In another embodiment a laterally displaceable armrests provide a seating area or surface of variable widths for accommodating different passenger sizes.

At least one armrest is movable either only vertically up and down or horizontally back and forth, or it can be tilted into cooperation with a bed surface and a seat surface so that the three surfaces together form the sleeping surface.

In a particularly lightweight construction a mattress such as a foam mattress is supported on a roll-up bed support which is made of a flexible but tough fabric suspended between a support bar and a spring roller which rolls up the fabric when the bed is not in use while the mattress is moved out of the way. The fabric is tough enough to form the bed surface and flexible enough to be taken up by the spring roller which functions in the manner of a roll-up window shade. The mattress can be tilted out of the way when the fabric bed support is rolled up.

In another embodiment one armrest is movable along a guide track between three positions, namely a vertical armrest position, a first horizontal bed position, and a second, somewhat higher horizontal table position.

The bed supporting surface is either mounted on a pedestal or the like in a fixed position or it is mounted on a piston cylinder device for positioning the bed surface or the bed support in at least two positions, namely a table position or a bed position.

BRIEF DESCRIPTION OF THE DRAWINGS

In order that the invention may be clearly understood, it will now be described in connection with example embodiments, with reference to the accompanying drawings, wherein:

FIG. 1 is a plan view of an upper deck cabin of a Boeing 747-200 passenger aircraft;

FIG. 2 shows a conventional chair that has been converted into a bed as shown and which is used in the aircraft cabin shown in FIG. 1;

FIG. 3 shows a plan view for an aircraft cabin accommodating eight chair/bed combinations according to the invention on a cabin floor space approximately 15×16 feet divided into four compartments by divider walls;

FIG. 4 is a front view of a seat bed combination according to the invention, wherein a seat surface is combinable with two armrest surfaces and two bed surfaces to form together a sleeping surface;

FIG. 5 is a front view, similar to FIG. 4, of an embodiment in which the seat width of the seat bed combination may be varied and the armrests may be completely removed;

FIG. 6 is a front view of a seat bed combination embodiment in which one armrest and one bed support are vertically movable;

FIG. 7 is a front view similar to FIG. 6 with a fixed bed surface and a tiltably movable armrest that fills the space between the seat surface and the bed surface to complete the present sleeping surface;

FIG. 8 is a front view of an embodiment with a fixed bed surface and an armrest vertically movable armrest along a guide rail secured to a cabin separation wall;

FIG. 9 is an embodiment with a vertically movable bed support that can function as a bed portion in a lower position and as a table in an upper position in which it also functions as an armrest;

FIG. 10 is a plan view of a lightweight embodiment in which a bed support for a mattress not shown, is formed by a flexible tough fabric adapted for roll-up by a spring roller, as shown, the bed support is rolled out;

FIG. 11 is a front view of an embodiment wherein the bed support is also a flexible tough fabric, however with a different orientation of the spring roller for rolling up the bed support;

FIG. 12 is an enlarged view of a support bearing fork and lock for a support bar of the flexible fabric forming a bed or mattress support;

FIG. 13 shows a front view of an embodiment with an armrest in a vertical orientation in which it functions as an armrest;

FIG. 14 shows the armrest of FIG. 13 in full lines in a bed forming position and in dashed lines in a table forming position;

FIG. 15 shows a guide track for the armrest of FIGS. 13 and 14;

FIG. 16 is a sectional view approximately along section line XVI—XVI in FIG. 15 which shows additionally a cam lock for securing the armrest with its cam follower to a cam guide track whereby the lock is in its unlocked position;

FIG. 16A is a view similar to that of FIG. 16, but showing the cam lock in a locked position;

FIG. 17 shows, on an enlarged scale, a sectional view approximately along section line XVII—XVII in FIG. 15 showing the cam follower in the cam guide track;

Figure 18:
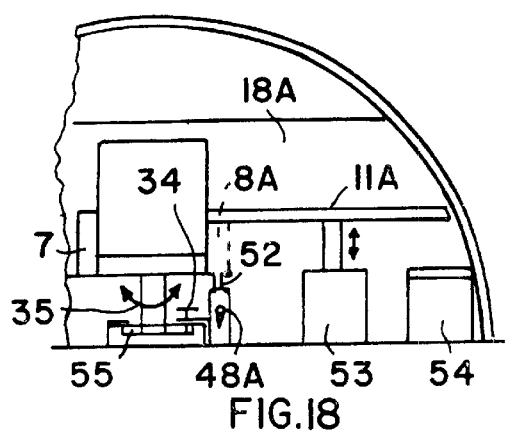
FIG. 18 is a front view of an embodiment in which a bed surface and an armrest are vertically movable and the chair has a rotatable base.

DETAILED DESCRIPTION OF PREFERRED EXAMPLE EMBODIMENTS AND OF THE BEST MODE OF THE INVENTION

FIGS. 1 and 2 representing the prior art have been adequately described above.

FIG. 3 shows a cabin layout 1 that would conveniently fit, for example into the upper deck cabin on a Boeing 747-200 passenger aircraft or into any other large bodied aircraft, such as the Airbus A-300-600. The available cabin space is divided into four compartments by longitudinal divider walls 18 and by crosswise separation walls 18A. Each compartment holds two seat bed combinations 2. The compartments are separated by an aisle 3. Each seat bed combination comprises a chair 4 and a separate bed section 5. Each seat bed combination is separated from the opposite combination by a compartment aisle 6. Each chair has a fixed armrest 7 and a movable armrest 8 as well as a backrest 9 that is preferably reclinable in a conventional manner. Each chair has a seat surface 10 that forms with the bed surface 11 a sleeping surface 20 having approximately a length of seventy-two inches, depending on the cabin width, on a width 19 of the aisle 3, on the width of the fixed armrest 7, and on the thickness of the divider walls 18. Each bed has a width 15 of at least thirty inches, depending on the width 16 of the respective aisle 6. Assuming that the aisle width 19 is twenty-four inches, the compartment length 17 will be seventy-eight inches, but depending on the overall width of the cabin 1 in the direction 14 crosswise to the length direction 13 in the longitudinal aircraft direction.

A space 12 is provided to permit reclining of the backrest 9. An arrow indicates the length direction 13 extending perpendicularly to any one of the backrests 9 in their upright position. A cross-direction extending perpendicularly to the length direction 13 is indicated by the arrow 14.

A substantial leg space is provided when the chairs 4 are displaced relative to each other in the cross-direction 14 as shown in the upper left-hand corner of FIG. 3. On the other hand, chairs 4 positioned directly opposite each other provide a better opportunity for conversation which may be preferred by certain passengers. The chair base may be shiftable in the direction 14 for this purpose.

The lower left-hand compartment shows a centrally positioned chair 41, the construction of which will be described in more detail with reference to FIGS. 4 and 5.

FIG. 4 shows an embodiment with the chair 4' and its seat forming surface 10 positioned between two separate bed sections 21 providing bed surfaces 11 one of which is shown by dashed lines in a table forming position 11A. At least one bed section 21 is mounted on a piston cylinder device 22 forming a lifting and lowering mechanism enabling the up and down movement of the respective bed surface 11 into the table forming position. The lifting and lowering mechanism can be powered by any conventional power source. For this purpose the right-hand armrest 8A is moved into a down position. The movability of the armrest 8A will be described in more detail below. When both armrests 8A are in the dashed line down position, their top surfaces TS form part of the sleeping surface that is formed by the seat surface 10 and the two bed surfaces 11 and 11A. The seat 4' is mounted on a fixed pedestal 23. One of the bed sections could also be mounted on a fixed pedestal, so that the surface 11 is flush with the seat surface 10.

FIG. 5 illustrates an embodiment similar to that of FIG. 4, however with laterally extendable armrests 8B movable on guide rods 24 that extend into and out of the seat section. Alternatively, the armrests are movable with the aid of guide bars 25 that extend into the backrest. In both embodiments the armrests are completely removable by pulling the guide bars completely out of respective guide channels in the seat or backrest. The armrests may be stored under the bed or in a box 54 shown in FIG. 18. The armrests 8B when functioning as such rest on the surfaces 11B of the bed sections when the bed sections are moved by the respective piston cylinder devices 22 into a position below the level defined by the seat surface 10. This embodiment provides the seating surface area required by certain passengers. The armrests 8B may be moved close to the seat section and close to the backrest section or they may be removed entirely as mentioned and as indicated by the arrows 27, whereby the bed sections with their surfaces 11 and 11B may be lifted into the level forming the sleeping surface or any one of these bed sections may be moved into a table forming position. The armrests 8B rest on the top of the bed surfaces when the latter are moved into a position below the level of the sleeping surface as indicated by the arrows 26. The chair mounting pedestals 23 and the piston cylinder devices 22 are all bolted to the cabin floor CF whereby conventional chair mounting rails may be used. This type of mounting has the advantage that the separate bed sections 21 can easily be replaced by further chairs that fit with their base 23 into respective floor rails, thereby providing space for six passengers in each compartment which may be desirable in a train or aircraft. However, there would then be no accommodation for sleeping.

In FIG. 6 the fixed armrest 7 is preferably mounted to the cabin separation wall 18. The vertically movable bed section is shown in full lines to form a table surface 11A. The dashed line position indicates the sleeping level. The movable armrest 8A is completely removable as will be described in more detail below. When the bed section 21 is in the dashed line position the movable armrest 8A will be moved downwardly, preferably to rest on a support S so that its top surface TS will become part of the sleeping surface between the surfaces 10 and 11A. When the armrest 8A is completely removed, comfortable leg space is provided under the table.

In FIG. 7 a rigid bed section 21 is rigidly mounted on a pedestal 30 at one end and on a bracket 29 at the other end. The movable armrest 8C is secured by a hinge 8C' for a tilting movement as indicated by the arrow 28, whereby the pedestal 30 also supports the armrest 8C when the latter is in the horizontal position to be part of the surface for sleeping between the surfaces 10 and 11. A lock L that may be any conventional lock bar, latch or the like, is provided for releasably holding the armrest 8C in a vertical position. Alternatively, the hinge 8C' may be of the type that locks itself when the armrest 8C is in a vertical position. An intentional push then brings the armrest 8C into a horizontal position between the bed section and the seat section.

In FIG. 8 a mattress 21' is supported by a rigid bed frame 31 resting on the pedestal 30 and on the bracket 29 in a fixed position so that the surface 11 is level with the seat surface 10 of a chair rigidly mounted on a pedestal 23. The vertically movable armrest 8A is secured to the cabin separation wall 18A along a guide track 31 enabling a movement of the armrest up or down as will be described in more detail with reference to FIGS. 16, 16A and 17. As shown in FIG. 8 the top surface TS of the vertically movable armrest 8A forms part of the sleeping surface between the bed surface 11 and the seat surface 10. Cam locks CL to be described in more detail below loosen the mounting of the armrest so that it can be shifted up or down and locked in the desired position.

FIG. 9 shows an embodiment in which the chair 4" is mounted on a rotatable chair base 33 as indicated by the arrow 35. A rotation stop lock 34 that can be operated by a foot pedal, for example, permits the rotation of the chair 4" for example through 90° when the lock is lifted and locks the chair into a rotated position relative to the base B. The bed section 21 is lifted by its piston cylinder device 22 into a table forming level in which position the table top surface 11A also forms an armrest with its chair facing end. The user or passenger can use the surface 11A as a table surface with the chair either in the shown position or in a rotated position, whereby the rigid bed base 31 supports a mattress that is firm enough to form a table surface, a writing surface, an armrest surface and a bed surface.

Figure 23:
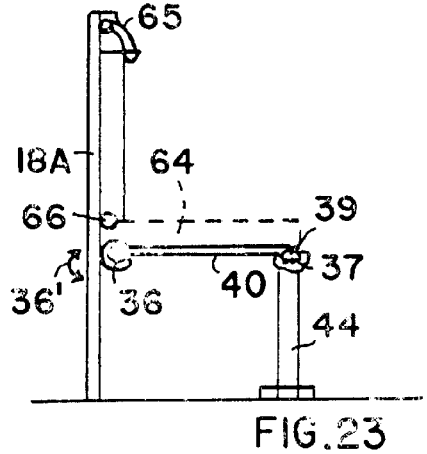
FIG. 23 is a view substantially in the direction of the arrow XXIII in FIG. 10, showing a mattress mounting above a flexible roll-up mattress support.

The top plan view of FIG. 10 illustrates an embodiment in which a mattress 64 shown in FIG. 23 rests on a tough, flexible fabric forming a mattress support 40. The mattress support 40 is secured at one end or edge to a spring roller 36 which is constructed in the manner of a window shade roll-up roller, thus being capable of rolling up the fabric 40 when the bed is not used. The other edge of the fabric 40 is secured to a support bar 39. Both the spring roller 36 and the support bar 39 have journal pins 38 at their ends. These journal pins 38 rest in respective support bearings 37 described in more detail with reference to FIG. 12.

In FIG. 11 the mattress 21' rests also on a support 40A made of a tough flexible fabric as in FIG. 10. However, in FIG. 11 the fabric is supported at one short end by a spring roller 36A and on the other short end by a support bar 39A. The respective journal pins again rest in a support bearing 37A as will be described in more detail with reference to FIG. 12. A vertically movable armrest 8A is positioned between the seat surface 10 and the mattress 21'. In the shown position the armrest 8A also forms part of the sleeping surface between the surfaces 10 and 11.

FIG. 12 shows the support bearings 37, 37A as a fork secured to a post 44 and forming a cradle in which the journal pin 38 of the respective support bar 39, 39A is received. To prevent escape of the pin 38 from its cradle a lock bail 41 is secured to the cradle by a hinge 42 at one end and by a lock screw 43 at the other end that is accessible for opening the lock and rolling up the bed support. When the support 40, 40A is to be rolled up, the lock screw 43 is loosened and the lock bail 41 is turned sufficiently clockwise to permit removing the pins 38 out of the cradle for the roll-up of the flexible tough fabric 40, 40A.

FIGS. 13, 14 and 15 illustrate an embodiment in which a movable armrest 8E can take up three different positions. FIG. 13 shows the armrest 8E in a vertical position permitting it to function as an armrest, whereby the armrest has at least one, preferably two through-holes 45 through which a mounting bar 49 shown in FIGS. 16, 16A and 17 extends as will be described in more detail below. FIG. 14 shows the armrest 8E in full lines forming part of the sleeping surface between the surfaces 10 and 11. Horizontally movable support brackets 50 hold the armrest 8E in its bed forming position. These brackets 50 are movable horizontally as indicated by the arrows 51 so that the brackets can be moved out of the way when the armrest 8E is in its dashed line position to form a table with comfortable leg room under the table.

Figure 20:
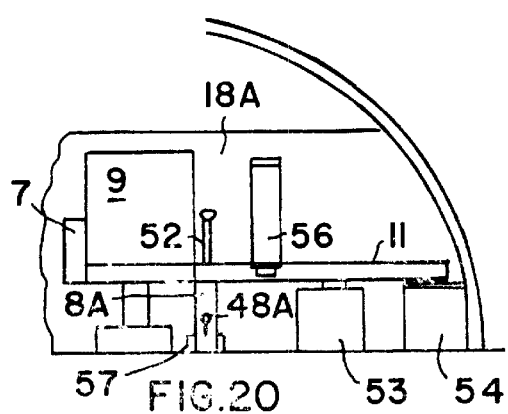
FIG. 20 is a view similar to that of FIG. 18, but showing the bed section in a position forming a sleeping surface and further illustrating a safety belt and a chair mounted in a fixed position.

FIG. 15 shows a cam track 46 for moving the movable armrest 8E to assume the above described three positions. The three sections of the cam track 46 are so dimensioned relative to the armrest 8E, that the movement into these three positions is possible. An armrest mounting bar 49, preferably two such bars, has rigidly secured at its inner end a cam follower 47. The cam follower 47 is guided in the cam track 46. The mounting bars 49 pass preferably entirely through the respective armrest through the holes 45. A cam lock 48 is secured to the mounting bar 49 either on the backside of the armrest as shown in FIGS. 16 and 16A or preferably on the front side of the armrest as shown in FIGS. 18 and 20.

FIG. 16 shows the cam lock 48 in a released position. The cam lock 48 has a handle and a wedging surface. Thus, when the cam lock is rotated it pulls the cam follower 47 against the inner wall of the cam track 46 thereby locking the armrest in place. In FIGS. 16 and 16A the cam lock 48 is positioned between the armrest 8E and the outwardly facing surface of the cam track 46. The mounting bar 49 reaches through the guide slot 46A of the cam track 46 as best seen in FIG. 17. As seen in FIG. 15, the cam track 46 is provided with openings 46B that permit inserting the cam follower 47 into the cam track. When the armrest is moved into the intended position the cam lock 48 is tightened as shown in FIG. 16A.

FIG. 18 shows an embodiment in which the chair is rotatable relative to its base as indicated by the arrow 35. A rotation stop lock 34 permits locking the chair in any desired position, but at least in each of two end positions. The armrest 8A is vertically movable and a cam lock 48A is secured to the outer end of the respective mounting bar 49 so that the wedging surface of the cam lock 48A bears against the front surface of the armrest. When the cam lock 48A is released the armrest 8A can be moved up or down. When the cam lock 48A is tightened, the armrest 8A is rigidly held in place either in the upper or in the lower position. Further, the armrest is completely removable when the cam lock 48A is released and the cam follower 47 is pulled out through an opening as shown at 46B in FIG. 15, but not seen in FIG. 18. When the armrest is completely removed and the bed forming surface is lifted by its piston cylinder 53 into a table top 11A position the bed surface forms a table. In the lowered, bed position one end of the sleeping support is supported on a luggage compartment 54 that is preferably accessible through a door positioned to face the viewer of FIG. 18.

Figure 19:
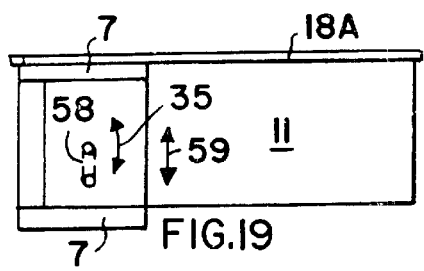
FIG. 19 is a top plan view of an embodiment similar to that of FIG. 18, however with a chair in which the rotatable base is also shiftable to permit the rotation and the chair has two fixed armrests.

FIG. 19 is a top plan view of FIG. 18, however with the added feature that the seat is not only rotatable as indicated by the arrows 35, but also movable along a guide slot 58 as indicated by the arrow 59 when the rotation stop lock 34 is released. This feature permits turning the seat which may be equipped with two fixed armrests 7 into a position that the backrest faces in the direction 14 rather than in the direction 13 as shown in FIG. 3. When the chair is in the position shown in FIG. 19, it may be pushed along the guide track 58 so that the inner armrest 7 rests against the cabin divider wall 18A, whereby the outer fixed armrest provides more privacy for the person using the combination as a bed. The lock 34 prevents in its locked position the rotation and the linear shifting of the chair.

FIG. 20 is similar to FIG. 18, however a safety belt 56 is provided between the divider wall 18A and the bed support forming the surface 11. The armrest 8A may rest with its lower end in a socket 57 to provide simultaneously a support for a bed section, the other end of which also rests on a luggage compartment. When the armrest is completely removed, comfortable leg space is provided when the bed surface is in the table forming position.

Figure 21:
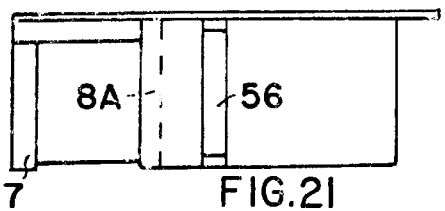
FIG. 21 is a top plan view of the embodiment of FIG. 20.

FIG. 21 shows a top plan view of the embodiment of FIG. 20, whereby the chair is not rotatable.

Figure 22:
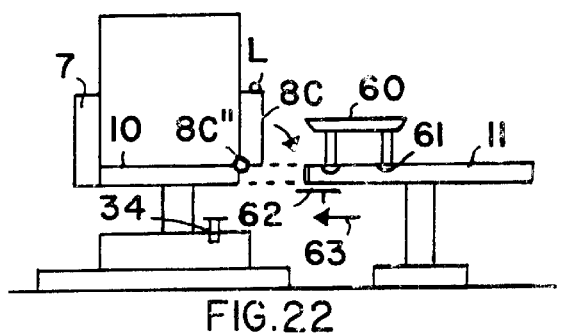
FIG. 22 is an embodiment with a fixed bed forming support adapted for carrying a table tray and a tiltable, removable armrest.

FIG. 22 shows a rotatable chair cooperating with a fixed bed section, whereby the surfaces 10 and 11 are permanently at the same level. However, the bed section surface 11 is provided with sockets 61 for mounting a table tray 60. A tiltable armrest 8C is locked by a lock L in the armrest position, but can be tilted downwardly so as to rest on a bracket 62 when the lock L is released and the bracket 62 is moved to the left as indicated by the arrow 63. When the combination is to be used as a table, the tray 60 is inserted into the sockets 61 and the armrest 8C is completely removed by removing the hinge pin 8C" out of the respective hinge or by releasing the armrest in any other convenient way.

FIG. 23 shows an embodiment with a mattress 64 such as a firm foam mattress hinged at 66 to extend in parallel to the divider wall 18A when the bed is not in use. A mattress lock 65 holds the mattress 64 in a vertical position. When the bed is used, the bed support 40 of a tough flexible fabric is pulled out from the spring roller 36 and the bed support bar 39 is caused to rest in the cradle 37 on its post 44. The lock bail 41 is locked. The lock 65 is opened and the mattress 64 is tilted into the dashed line position to form the bed.

Figure 24:
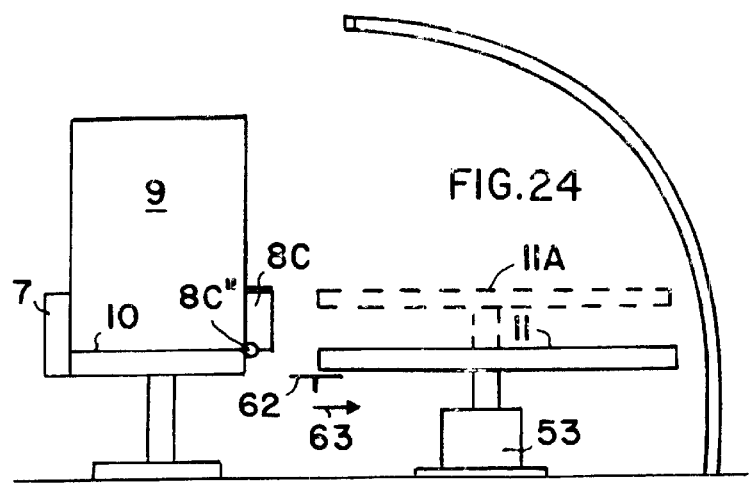
FIG. 24 is a front view of an embodiment in which a tiltable armrest has a removable hinge pin for convenient removal of the armrest when the sleeping surface is used as a table shown in dashed lines.

FIG. 24 shows an embodiment where the fixed bed section has been replaced by a vertically movable bed section on a piston cylinder device 53. The armrest 8C is again removable by withdrawing a hinge pin 8C" when the bed section is in the table forming dashed line position 11A. The bracket 62 is then moved under the "table" as indicated by the arrow 63 to provide unobstructed space under the table.

Figure 25:
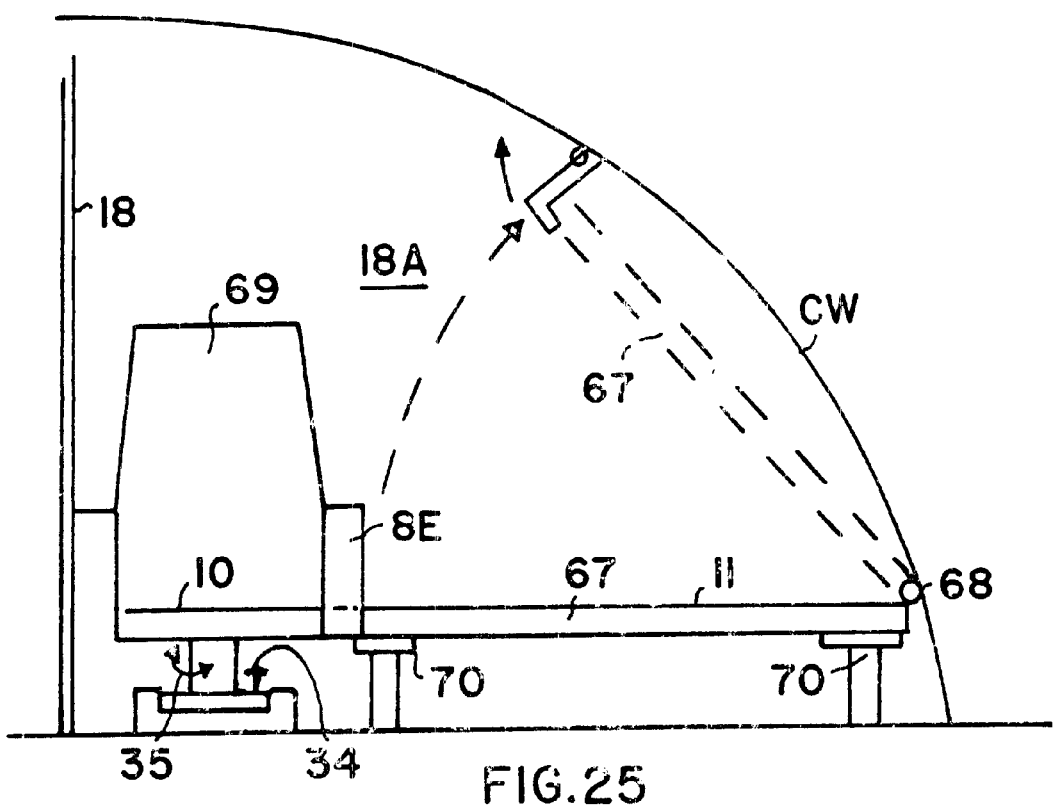
FIG. 25 is a front view of an embodiment with a tiltable bed section and a chair rotatable about a vertical axis.

FIG. 25 shows a bed section 67 hinged by a hinge 68 to a cabin wall CW or to a longitudinal divider wall 18 or to a cross-divider wall 18A. A cooperating chair 69 is rotatably mounted to the floor as in FIG. 18 to bring the chair 69 from the position facing in the direction 13 into a bed forming position facing in the direction 14. When the bed section 67 is lowered its short end facing the chair rests on a bracket or support 70 and both the bed surface 11 and the seat surface 10 form the sleeping surface. For this purpose the bed section 67 may be hinged at its short end as shown or along its long edge. The armrest 8E may be either removable or the chair is so dimensioned that after rotation the front edge of the seat is aligned with the respective short edge of the bed section 67. If necessary for this alignment the chair may be linearly displaceable as described above with reference to FIG. 19 to avoid interference with the chair rotation. Once chair rotation is completed the chair may be linearly shifted back into proper position for alignment with the short end of the bed section.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A chair and bed combination for a passenger, said combination comprising a passenger chair with a seat forming a seat surface, at least one separate bed section forming a bed surface, and means for bringing at least one of said seat surface and said bed surface into a position for cooperating with the respective other surface in forming together a surface for sleeping, wherein said separate bed section comprises a flexible roll-up support, a roll-up mechanism along a first edge of said flexible roll-up support for storing said flexible roll-up support when it is not in use, a securing bar attached to a second edge opposite said first edge, and at least one post for holding said securing bar in place when said flexible roll-up support is rolled out to form a bed support.

2. The combination of claim 1, further comprising a lock for securing said support bar to said post, when said flexible roll-up support is rolled out.

3. The combination of claim 1, wherein said flexible roll-up support is a flexible tough fabric.

4. The combination of claim 1, further comprising a mattress and a hinge securing said mattress to a cabin wall alongside said flexible roll-up support for tilting said mattress onto said flexible roll-up support when said flexible roll-up support is rolled out to form said sleeping surface.

5. A chair and bed combination for a passenger, said combination comprising a passenger chair with a seat forming a seat surface, at least one separate bed section forming a bed surface, and means for bringing at least one of said seat surface and said bed surface into a position for cooperating with the respective other surface in forming together a surface for sleeping, wherein said passenger chair defines a facing direction, wherein said separate bed section comprises a rectangular shape having two short ends and two long sides defining a length direction extending perpendicularly to said facing direction, said passenger chair further comprising a backrest and a fixed armrest, said means for bringing comprising a bed hinge mounting for securing said separate bed section to a wall, said bed hinge mounting permitting moving said separate bed section between a horizontal position and a retracted position, said combination further comprising a movable armrest for cooperation with said separate bed section when said separate bed section is in said horizontal position and for forming part of said passenger chair when said separate bed section is in said retracted position.

6. The combination of claim 5, further comprising a hinged armrest mounting securing said movable armrest for cooperation with said passenger chair opposite said fixed armrest and for moving said movable armrest into a position for cooperation with said separate bed section when said separate bed section is in said horizontal position.

7. The combination of claim 5, further comprising a slidable armrest mounting securing said movable armrest in an upper position for cooperation with said passenger chair opposite said fixed armrest and in a lower position for cooperation with said separate bed section when said separate bed section is in said horizontal position.

8. The combination of claim 5, wherein said bed hinge mounting is secured to one of said long sides of said separate bed section for attaching said separate bed section to a cabin wall extending parallel to said length direction of said separate bed section.

9. The combination of claim 5, wherein said bed hinge mounting is secured to one of said short ends of said separate bed section for attaching said separate bed section to a wall extending in parallel to said facing direction.

10. A chair and bed combination for a passenger, said combination comprising a passenger chair with a seat forming a seat surface, at least one separate bed section forming a bed surface, and means for bringing at least one of said seat surface and said bed surface into a position for cooperating with the respective other surface in forming together a surface for sleeping, wherein said passenger chair comprises a backrest, a fixed armrest and a tiltable armrest, an armrest hinge securing said tiltable armrest to said passenger chair for tilting said tiltable armrest between a vertical position and a horizontal position, and locking means for securing said tiltable armrest in any one of said horizontal and vertical positions, so that said second tiltable armrest in its horizontal position forms part of said surface for sleeping between said bed surface and said seat surface.

11. The combination of claim 10, wherein said means for bringing comprise a chair guide rail and a chair mounting guided and secured in said guide rail for displacing said passenger chair in a linear direction.

12. The combination of claim 10, wherein said means for bringing comprise a rotatable chair support for rotating said passenger chair at least through an angle of 90°, and wherein said means for bringing further comprise a lifting and lowering device for bringing said separate bed section into an elevational position wherein said bed surface serves as a table.

13. The combination of claim 10, wherein said means for bringing comprise a chair mounting securing said passenger chair on a floor, said means for bringing further comprising a hinge tiltably securing a short end of said a separate bed section in a substantially upright position, and means for holding said separate bed section in a horizontal position for cooperation with said seat surface in forming said surface for sleeping.

14. A chair and bed combination for a passenger, said combination comprising a passenger chair with a seat forming a seat surface, at least one separate bed section forming a bed surface, and means for bringing at least one of said seat surface and said bed surface into a position for cooperating with the respective other surface in forming together a surface for sleeping, wherein said means for bringing comprise a chair mounting for securing said passenger chair to a floor and for rotating said passenger chair about a vertical axis through an angular range, and a separate bed mounting for positioning said separate bed section at an elevational level such that said bed surface is level with said seat surface to form together with said seat surface said surface for sleeping when said chair section has been rotated by 90° about said vertical axis, said combination further comprising a guide rail for securing said chair mounting to said floor, said chair mounting riding in said guide rail for shifting said passenger chair horizontally, said chair mounting permitting said 90° rotation of said chair in different positions along said guide rail without interference, and wherein said bed mounting holds said separate bed section in a horizontal position.

15. The combination of claim 14, wherein said separate bed mounting comprises a hinged bed mounting holding said separate bed section normally in an up-tilted position, and wherein said chair mounting is adapted for permitting rotation of said passenger chair when said separate bed section is in said up-tilted position, said separate bed mounting holding said separate bed section in a horizontal position abutting said seat surface with said bed surface in a position flush with said seat surface for forming said surface for sleeping after rotation of said passenger chair.

16. The combination of claim 14, wherein said hinged bed mounting permits tilting said separate bed section between said up-tilted position and said horizontal position, said combination further comprising a locking device for securing said separate bed section in said horizontal and vertical positions.

17. A chair and bed combination for a passenger, said combination comprising a passenger chair with a seat forming a seat surface, at least one separate bed section forming a bed surface, and means for bringing at least one of said seat surface and said bed surface into a position for cooperating with the respective other surface in forming together a surface for sleeping, wherein said passenger chair further comprises a backrest defining a facing direction (13) perpendicularly to said backrest when said backrest is in an upright normal position, wherein said separate bed section has a length direction (14) extending perpendicularly to said facing direction (13), and wherein said separate bed section has a short end extending in parallel to said facing direction, wherein said passenger chair further comprises a fixed armrest (7) opposite said separate bed section, said fixed armrest comprising an armrest surface facing upwardly, said upwardly facing armrest surface defining a first horizontal level, and wherein said means for bringing comprises a lifting and lowering mechanism for moving said separate bed section into a first horizontal position level with said upwardly facing armrest surface so that said short end of said separate bed section next to said passenger chair forms a second armrest opposite said first armrest, said lifting and lowering mechanism permitting moving said separate bed section into a second horizontal position in which said bed surface of said separate bed section is flush with said seat surface for forming said surface for sleeping.

18. The combination of claim 17, wherein said short end of said separate bed section forms a table top when said separate bed section is in an elevated position.

19. A chair and bed combination for a passenger, said combination comprising a passenger chair with a seat forming a seat surface, at least one separate bed section forming a bed surface, and means for bringing at least one of said seat surface and said bed surface into a position for cooperating with the respective other surface in forming together a surface for sleeping, said combination further comprising a movable armrest between said passenger and said separate bed section, and wherein said means for bringing cooperate with said movable armrest for holding said movable armrest in an upright position to function as an armrest and for moving said movable armrest into a horizontal position to function as part of said surface for sleeping.

20. The combination of claim 19, wherein said passenger chair further comprises a backrest defining a facing direction (13) perpendicularly to said backrest when said backrest is in an upright normal position, wherein said separate bed section has a length direction (14) extending perpendicularly to said facing direction (13), and wherein said separate bed section has a short end extending in parallel to said facing direction.

21. The combination of claim 19, wherein said means for bringing comprise at least one lifting and lowering mechanism for moving said separate bed section.

22. The combination of claim 19, wherein said means for bringing comprise a fixed mounting for said passenger chair and a movable mounting for said separate bed section.

23. The combination of claim 20, wherein said short end of said separate bed section forms a table top in an elevated position of said separate bed section.

\* \* \* \* \*

UNITED STATES PATENT AND TRADEMARK OFFICE
CERTIFICATE OF CORRECTION

PATENT NO. : 6,398,164 B1
DATED : June 4, 2002
INVENTOR(S) : Fasse

It is certified that error appears in the above-identified patent and that said Letters Patent is hereby corrected as shown below:

Title page,
Item [76], Inventor, replace "P.O. Box K" by -- P.O. Box 185 --;
Item [57], ABSTRACT,
Line 6, after "cooperation", replace "fo" by -- for --;

Column 2,
Line 3, after "embodiment", delete -- a --;

Column 4,
Line 32, after "chair", replace "41" by -- 4' --;

Column 11,
Line 15, after "passenger", insert -- chair --.

Signed and Sealed this

Twenty-ninth Day of October, 2002

*Attest:*

JAMES E. ROGAN
*Director of the United States Patent and Trademark Office*

*Attesting Officer*